Patented Aug. 6, 1946

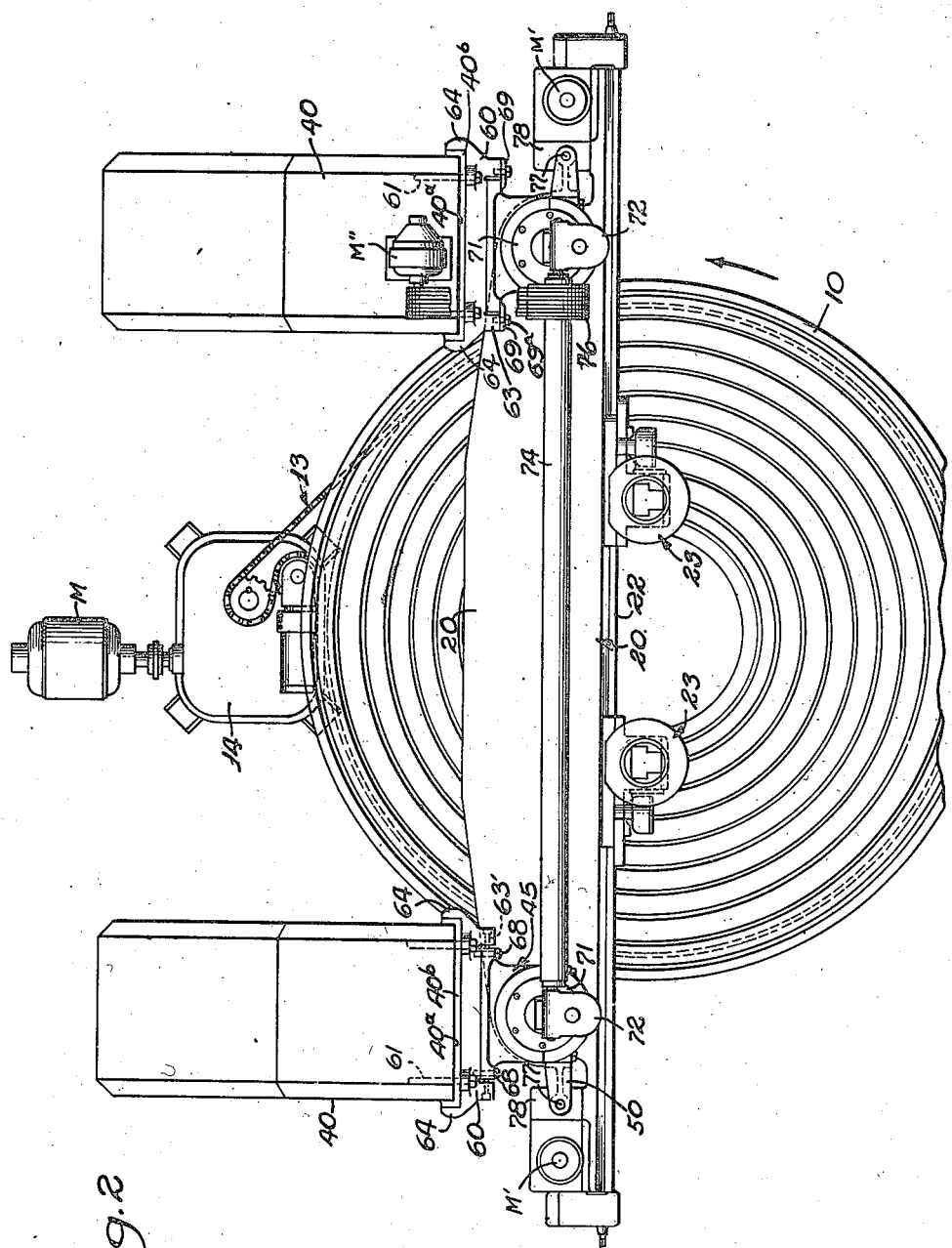

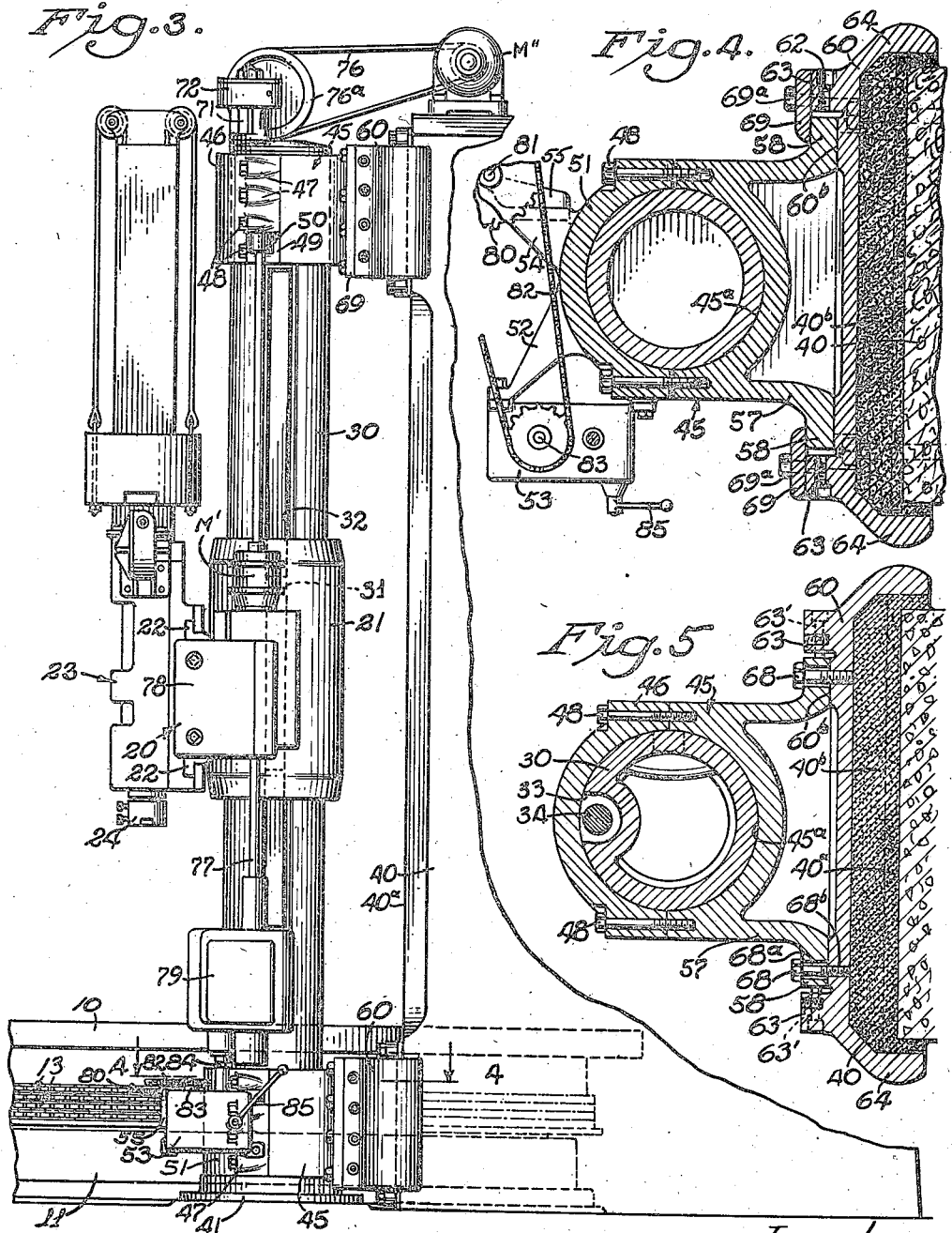

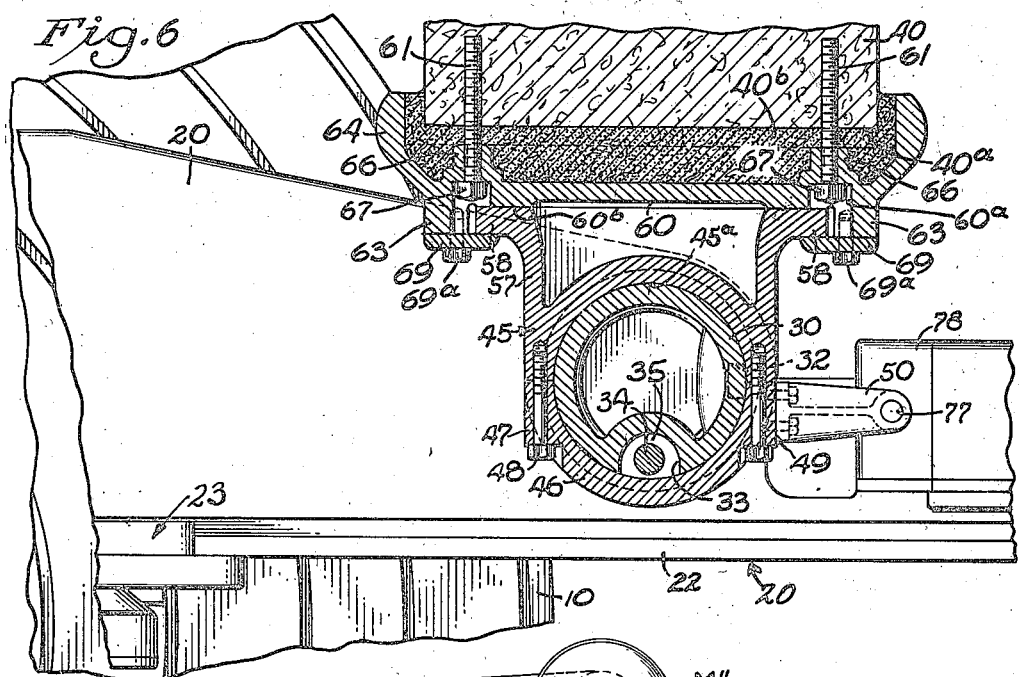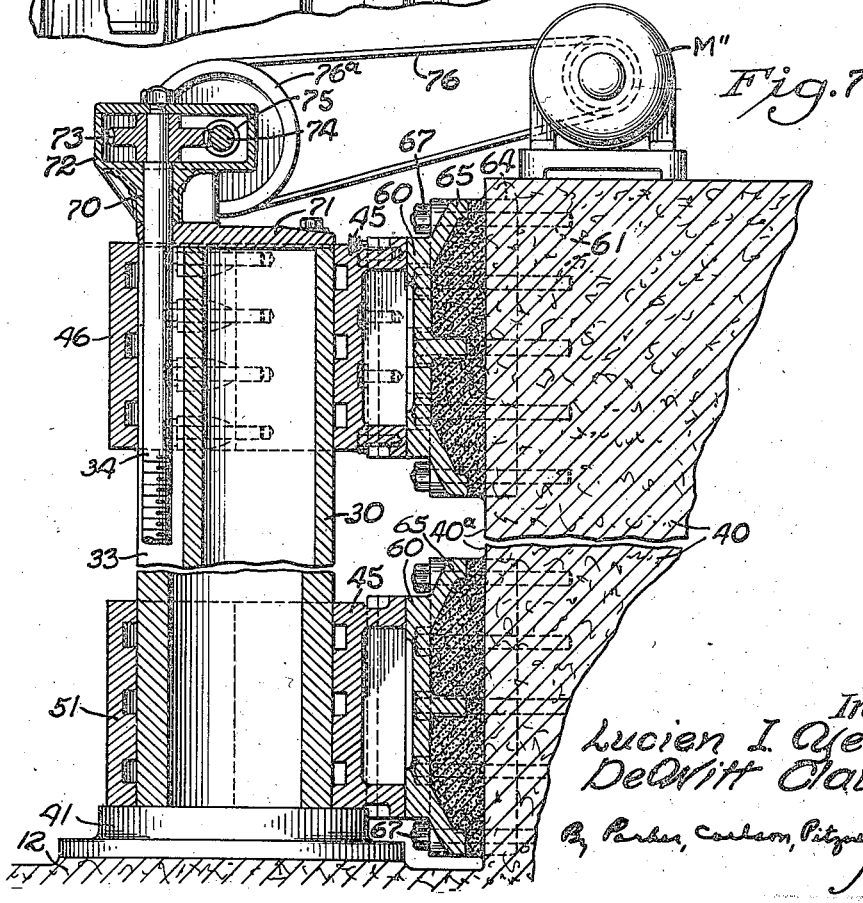

2,405,387

UNITED STATES PATENT OFFICE 2,405,387

MACHINE TOOL

Lucien I. Yeomans and De Witt Clausen, Chicago, Ill., assignors to Lucien I. Yeomans, Inc., Chicago, Ill., a corporation of Illinois Application April 23, 1943, Serial No. 484,176

6 Claims. (Cl. 90—37)

1

The invention relates to machine tools generally and more particularly to machine tools of the type having a bridge member or crossrail extending over a work support and carrying a translatable tool for operating on the work.

One object of the invention is to provide an improved crossrail supporting and guiding structure particularly suitable for machine tools of large size.

Another object is to provide a crossrail support of simple and rugged construction adapted to guide a long heavy crossrail with the accuracy required for precision machine work.

Another object is to provide a novel rail supporting structure adapted to permit of differential thermal expansion and contraction between the rail and its mounting.

Still another object is to provide a novel crossrail supporting structure in which the parts requiring accurate machining are relatively few in number, standardized to a substantial degree for economy and manufacture, and are of a size which enables them to be transported conveniently to and assembled with the more massive elements of the structure erected independently at the location at which the machine tool is to be used.

Other objects and advantages of the invention will become apparent from the following detailed description of the preferred embodiment illustrated in the accompanying drawings in which Figure 1 is a front elevational view of one form of machine tool in which the invention may be embodied.

Fig. 2 is a plan view.

Fig. 3 is a fragmentary right side view.

Fig. 4 is a fragmentary sectional view taken in a horizontal plane substantially on the line 4—4 of Fig. 3.

Fig. 5 is a fragmentary sectional view taken in a horizontal plane substantially on the line 5—5 of Fig. 1.

Fig. 6 is a fragmentary sectional view taken in a horizontal plane substantially on the line 6—6 of Fig. 1.

Fig. 7 is a sectional view taken in a vertical plane substantially on the line 7—7 of Fig. 1.

Figure 1:
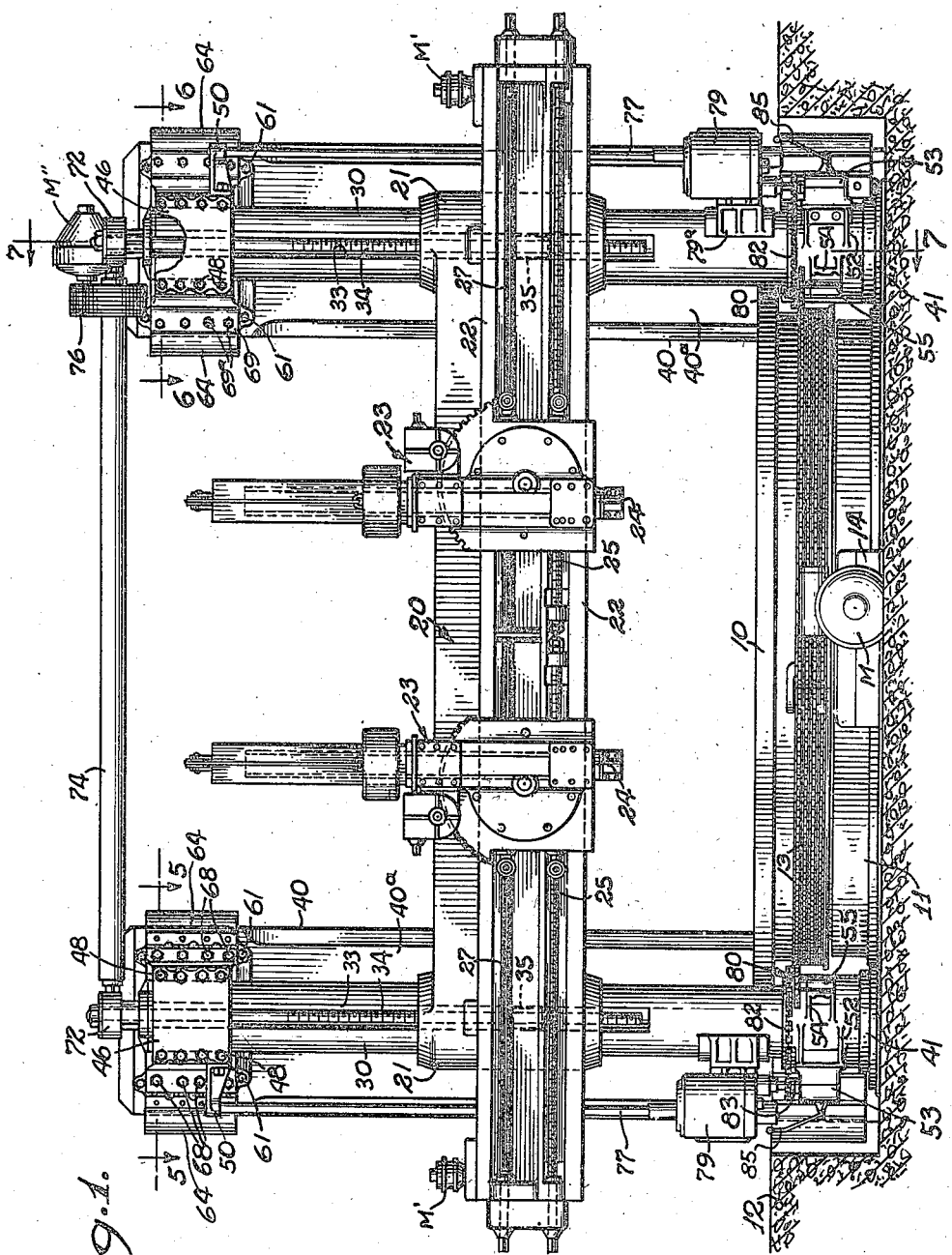

While the invention is susceptible of various modifications and may be practiced in various ways, we have illustrated in the drawings and will describe in detail the preferred embodiment and method. It is to be understood, however, that we do not intend to limit the invention by such specific disclosure but aim to cover all modifications, alternative constructions, and uses falling within the spirit and scope of the invention as expressed in the appended claims.

For purposes of illustration, the invention is embodied in a machine tool of the type commonly known as a vertical boring mill. The machine includes a horizontally disposed circular table 10 supported for rotation on a base 11 resting on a floor or other suitable foundation 12. The table 10 is adapted to be driven in a counterclockwise direction as viewed in Fig. 2 by suitable driving mechanism such, for example, as heavy chains 13 frictionally engaging the table periphery and driven by motors M through speed reducers 14 located at the front and rear of the machine.

Work carried on the table 10 is machined by one or more tools mounted on an elongated bridge member or crossrail 20 extending transversely across the table and adjustably supported for bodily vertical movement toward or from the table. On its front face, the rail is formed with spaced parallel ways 22 on which tool heads 23 are mounted for horizontal movement which may be produced by the rotation of screws 25 threading into nuts on the heads. Slidable vertically on each tool head is a ram 24 to the lower end of which a suitable tool may be fastened for performing planing or other desired operations on work rotating with the table. The rams may be fed axially in the usual way by a rack and pinion mechanism (not shown) actuated by rotation of a spline shaft 27 mounted on the rail. Through appropriate clutch and speed reduction mechanism, either the screw 25 or the shaft 27 may be driven at a rapid traverse rate by a motor M' mounted on the end of the bridge. Or, either of these elements may be translated at a feed rate by rotation of a vertical spline shaft 77 adapted to be driven as described later in timed relation to the rotation of the table.

In its preferred form, the novel structure for supporting and guiding the crossrail 20 includes a pair of ways or guide members herein shown as elongated cylindrical posts 30 dimensioned to fit slidably within members or bearings 21 which comprise cylindrical sleeves of substantial length integral with or rigidly secured to the rail on the rear side thereof and spaced short distances from the rail ends. To maintain the posts and bearings 21 in fixed angular relation, each bearing has an internal key 31 (Figs. 3 and 6) engaging in a longitudinal keyway 32 in the outer side of the associated post.

The posts 30 may comprise tubular generally cylindrical castings adapted for economical machining. Each is formed with a forwardly opening longitudinal slot 33 in which is disposed an elongated feed element such as a screw 34 threading into a coacting feed element or nut 35 mounted on the crossrail within the guide member 21. The crossrail is thus supported by the screws 34 and may be raised or lowered by rotating the screws in unison in one direction or the other.

At their upper and lower ends, the posts are held against lateral displacement by a pair of massive upright columns 40 erected at each side of the table 10 and rearwardly from the center thereof. These columns may be of any suitable type, but for reasons of economy of construction at the location where the machine tool is to be used, it is preferred to cast them of reinforced concrete. The columns are called upon to provide only the lateral support for the guide posts 30 while the weight of each post and the load carried thereby are sustained by a sole plate 41 of cast iron or other suitable material resting on the floor or foundation 12 in front of the column. Thus, the strains imposed on the concrete columns are reduced to a minimum.

Clamping brackets of simple and rugged construction are provided for securing the guide posts 30 to the concrete columns 40. Preferably, though not necessarily, these brackets are similar in construction and made in two parts. Herein, each comprises a base 45 having an outwardly opening semi-cylindrical recess 45ª and coacting with a similarly recessed cap to define a cylindrical socket for receiving the guide post. The caps for the upper brackets differ slightly from those of the lower brackets to provide for the mounting of certain auxiliary apparatus. Thus, each upper bracket cap 46 has a series of laterally projecting lugs 47 (Fig. 3) along each side drilled to receive machine screws 48 by which the caps are removably secured to their associated bases 45. In these cases, the screws are tightened only enough to take up looseness while leaving the upper end of the post free to slide endwise in the bracket. A pad 49 (Fig. 6) is formed on each side of the cap for interchangeably mounting an arm 50 at either side of the bracket as required.

Each of the lower clamping brackets is equipped with a cap 51 (Figs. 3 and 4) of a semi-cylindrical form having similar mounting lugs 47 and adapted to be bolted to the bases 45 in the same manner as the caps 46. In the case of these lower brackets, the screws 48 are tightened more firmly so as to anchor the lower ends of the parts rigidly to the concrete columns. By thus anchoring the lower ends of the posts rigidly while permitting sliding of the upper ends in their brackets, differential thermal expansion between the columns and the posts is provided for.

Each cap 51 is formed with an outwardly projecting arm 52 (Fig. 4) having an end surface alined with suitable pads on the side of the cap to support the housing 53 of a feed mechanism. A second outwardly projecting arm 54 (Fig. 1) on the cap 51 serves to support a bearing bracket 55, the purpose of which will appear presently. The lower brackets may be positioned with the supporting arms facing outwardly in either direction and thus are adaptable for use on either side of the machine as shown in Fig. 1.

To facilitate manufacture, the bases 45 for all of the post clamping brackets may be exactly alike both in form and dimensions. Herein, each base has a neck portion 57 extending rearwardly from the recessed portion and merging with laterally projecting flat flanges 58 which are machined on both sides.

The concrete columns 40 may be integral with or rigidly anchored to the foundation 12. They are finished in a novel manner to provide accurately located bearing surfaces against which the bases of the post guiding brackets may be clamped with the axes of the posts disposed precisely vertically. To this end, the columns are cast initially with substantially flat front faces 40ª offset rearwardly from the vertical plane in which the bracket bearing surfaces are to lie in the finished machine. Face plates 60 are loosely mounted on the front column faces by means of anchor bolts 61 cast in the columns. The plates are then positioned accurately on the two columns with their machined front faces 60ª disposed in a common vertical plane, set screws or other suitable devices (not shown) being employed to facilitate the adjustment of the individual face plates and holding them spaced accurately from the column surface 40ª. While the face plates are thus supported, cement is forced in between the plates and the column faces to form grouting layers 40ᵇ which constitute a rigid backing for each plate.

Herein, all four face plates 60 are of similar construction so that they may be used interchangeably at either the upper or lower end of either column. As shown in Figs. 6 and 7, each plate comprises a flat generally rectangular body portion having forwardly projecting flanges 63 at each side edge defining an outwardly opening recess for reception of the flanges 58 of the clamping brackets. The recess is dimensioned to provide clearance at each side of the flanges, and the bottom surface 60ᵇ is machined flat so as to be adapted for abutting engagement with the flanges.

Rearwardly projecting flanges 64 and 65 (Figs. 6 and 7) are provided at the side edges and the upper and lower edges of the face plates to facilitate grouting thereof to the column. Ribs or bosses 66 on the rear face of the plate are drilled to accommodate the anchor bolts 61 and permit the front face of the plate to be recessed as indicated at 60ª (Fig. 6) for the reception of nuts 67 which are threaded onto the anchor bolts to hold the face plate in fixed position on the column.

Provision is made for clamping the brackets 45 rigidly to the face plates 60 on one column, the one on the left side of the machine in this instance. This is accomplished by cap screws 68 (Fig. 5) extending loosely through two rows of holes 68ª in the bracket flanges 58 and threading into tapped holes 68ᵇ in the face plate 60 to clamp the flanges against the machined surfaces 60ª. Before final tightening of the screws, screws 63′ threading through laterally extending holes 62 (Fig. 4) in the flanges 63 are brought into engagement with the sides of the flanges and then adjusted to shift the bracket base 45 and locate its post recess precisely vertical. The screws 68 together with the set screws 63′ thus anchor the bracket bases securely to the left column.

The other brackets for the post on the right side of the machine are, in accordance with the present invention, clamped against the face plate surfaces 60ᵇ so as to permit of some degree of laterally sliding movement and thereby allow freedom of thermal expansion and contraction of the crossrail relative to the concrete columns. This is accomplished by plates 69 (Fig. 4) secured to the face plate flanges 63 by cap screws 69ª with their inner edge portions overlying and bearing against the flanges 58 so as to hold the latter against the surfaces 60ᵇ. By spacing the flanges 58 closer together than the flanges 63, allowance is made for a small amount of lateral shifting of the brackets on the right side of the machine relative to their face plates.

With the table 10 rotating counterclockwise as viewed in Fig. 2, it will be apparent that the reactionary forces applied to the crossrail 22 as a result of engagement of a tool and the work will subject the brackets holding the guide posts on the left side of the machine to a pulling strain. On the other hand, the brackets for the other or right-hand post are placed under compression which may be sustained more easily than the tensile strains on the left-hand brackets. It is desirable therefore that the location of the sliding connections above described between the posts and columns be correlated with the direction of rotation of the table and, as in the present instance, be incorporated in the bracket which is subjected to compression only in the normal operation of the machine tool.

The invention contemplates mounting of the feed screws 34 and the actuating mechanism therefor in a novel manner such that the entire weight of the rail 22 and the associated parts is sustained by the posts 30 alone, thereby relieving the concrete columns of this burden. Accordingly, the upper end of each screw is journaled in a bearing 70 (Fig. 7) on a cap 71 secured to the upper end of each post 30. A worm wheel 73 fast on the screw rests on this bearing and is disposed within a housing 72 and in mesh with a worm 75 on a shaft 74. The latter extends across the machine and carries the worm associated with the other feed screw. A reversible electric motor M" mounted on the top of one of the columns 40 is arranged to drive the shaft 74 through a multiple V-belt 76 extending around a pulley 76ᵃ on the shaft. By controlling the direction of operation of the motor, the rail may be raised or lowered along the posts any desired distance.

The mechanism for driving the tool head feed screws 25 at a feed rate is also supported solely from the posts 30. To this end, the spline shafts 77 above referred to extend through housings 78 carried on the rail and containing clutch mechanism of well known construction for connecting each shaft 77 selectively either to the screw 25 or to the splined feed shaft 27. At its lower end, each shaft extends into a box 79 containing speed-change gearing and supported by a bracket 79ᵃ secured to associated post 30 as shown in Fig. 1.

Through the medium of suitable transmission mechanism, the gearing enclosed within the gear box 79 is driven in timed relation to the rotation of the table 10. This mechanism includes a sprocket wheel 80 on a shaft 81 (Figs. 1 and 4) journaled on the bearing bracket 55 and engaging the table driving chain 13. A second chain 82 transmits the rotary motion of the sprocket 80 to a shaft 83 leading into the housing 53 which contains suitable clutch and reversing mechanism controlled selectively by a hand lever 85. The output shaft 84 from this mechanism extends to the gear box 79.

It will be apparent from the foregoing that the invention provides a crossrail supporting and guiding structure of novel and advantageous character particularly suitable for large size machine tools. The parts requiring accurate machining are relatively few in number, standardized for interchangeability and are of a size which permits them to be manufactured economically. Moreover, by reason of their relatively small size, the parts may be conveniently transported to and easily assembled at the location at which the machine is to be used.

By utilizing rail guiding members separable from their associated supporting structure, the massive parts of the structure may take the form of concrete columns. Provision is made for supporting the entire weight of the guide members, the rail and the actuating mechanism therefor on the floor or foundation so that the columns are only required to provide lateral support for the guide members. Furthermore, the columns may be built by ordinary construction methods and by grouting accurately alined face plates thereon, precise location of the elements of the supporting structure may be obtained easily.

The improved crossrail supporting structure is also advantageous in that allowance is made for expansion and contraction of the rail and also of the guide posts due to temperature changes which do not correspondingly change the dimensions of the concrete structure. This is of substantial importance in the case of large size machine tools as it effectually prevents binding of the rail on the guide members, relieves the various elements of unnecessary strains, and makes for accuracy of the work surfaces machined by the tool.

While it is desirable in order to facilitate manufacture to make the post holding brackets on both sides of the machines of similar construction, this, of course, is not essential. The left-hand brackets and their associated face plates may, if desired, be formed as one integral piece into which the post would be inserted and positioned vertically before grouting of the bracket to the column.

We claim as our invention:

1. A machine tool having, in combination, upright columns of concrete or the like, similarly constructed face plates grouted to said columns at the upper and lower ends thereof, a pair of vertical parallel guide posts disposed in front of said columns, similarly constructed brackets enclosing the upper and lower ends of posts and abutting against the faces of said plates, means clamping the brackets of one post rigidly against its face plates, and means clamping the brackets of the other post slidably against its face plates.

2. A machine tool having, in combination, two rigid upright columns, spaced parallel guide posts disposed in front of said columns, a crossrail bridging said posts and slidable therealong, means connecting the upper and lower ends of one of said posts and its column and holding the latter post rigidly against lateral displacement in all directions, and means connecting the upper and lower ends of the other post to its column while permitting some degree of lateral shifting of the post relative to the column in a direction longitudinally of said crossrail.

3. A machine tool having, in combination, two rigid upright columns, spaced parallel guide posts disposed in front of said columns, a crossrail bridging said posts and slidable therealong, means connecting the upper and lower ends of one of said posts and its column and holding the latter post rigidly against lateral displacement in all directions, brackets secured to the upper and lower ends of said other post and having rear surfaces disposed parallel to said crossrail, and means clamping said brackets slidably against said other column whereby to permit freedom of thermal expansion of said crossrail.

4. A machine tool having, in combination, a horizontal work table normally adapted for rotation in one direction, columns disposed on opposed sides of said table, guide posts supported in front of said columns, a crossrail slidable vertically along said posts and adapted to support a tool for operating on a workpiece carried by said table, brackets at the upper and lower ends of said posts connected to said columns to provide lateral support for the posts, the brackets on the post which is urged away from its column during engagement of the tool and workpiece being anchored rigidly to their column, and the other brackets being clamped against their column for sliding movement in a direction longitudinally of said crossrail.

5. In a machine tool, the combination of a pair of stationarily mounted laterally spaced upright concrete columns, a pair of upright metal guide posts disposed alongside respective ones of said columns, a metal crossrail slidable vertically on said posts, means connecting one of said posts to its associated column for restraining such post against bodily displacement laterally of said column, and means connecting the other of said posts to its associated column for frictionally restrained lateral displacement toward and away from said one post to accommodate thermally induced changes in the length of said crossrail.

6. A machine tool having, in combination, a generally horizontal work supporting table, a rigid upright concrete column rising from a point adjacent said table, a metal upright guide post rising alongside said column, means slidably guided by said post for supporting a tool above said table, means supporting the lower end of said post independently of said column, and means connecting the upper end portion of said post to said column for retaining said portion against lateral displacement relative to the column while leaving said post free for endwise thermal expansion relative to said column.

LUCIEN I. YEOMANS.
DE WITT CLAUSEN.